(12) United States Patent
Kitamura et al.

(10) Patent No.: US 8,259,990 B2
(45) Date of Patent: Sep. 4, 2012

(54) MONITORING AND OPERATION IMAGE INTEGRATING SYSTEM OF PLANTS AND MONITORING AND OPERATION IMAGE INTEGRATING METHOD

(75) Inventors: Masashi Kitamura, Tokyo (JP);
Tadashi Ohi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 1003 days.

(21) Appl. No.: 11/772,849

(22) Filed: Jul. 3, 2007

(65) Prior Publication Data
US 2008/0205693 A1    Aug. 28, 2008

(30) Foreign Application Priority Data

Feb. 23, 2007   (JP) ................................. 2007-043873

(51) Int. Cl.
*G06K 9/00* (2006.01)
*H04N 7/18* (2006.01)
(52) U.S. Cl. ......................................... 382/100; 348/159
(58) Field of Classification Search .................. 382/100; 348/143, 159
See application file for complete search history.

(56) References Cited

U.S. PATENT DOCUMENTS

| 5,539,477 | A | * | 7/1996 | Miyajima | 348/730 |
| 5,671,009 | A | * | 9/1997 | Chun | 348/153 |
| 5,758,110 | A | * | 5/1998 | Boss et al. | 715/751 |
| 7,562,299 | B2 | * | 7/2009 | Millar et al. | 715/719 |
| 2004/0032494 | A1 | * | 2/2004 | Ito et al. | 348/152 |
| 2004/0148193 | A1 | * | 7/2004 | Blackburn | 705/2 |
| 2005/0015527 | A1 | * | 1/2005 | Tanner | 710/68 |
| 2005/0220361 | A1 | * | 10/2005 | Yamasaki | 382/284 |
| 2010/0002082 | A1 | * | 1/2010 | Buehler et al. | 348/159 |
| 2011/0015918 | A1 | * | 1/2011 | Kalbarga | 703/23 |

FOREIGN PATENT DOCUMENTS

| JP | 63-027903 | | 2/1988 |
| JP | 03-128495 | | 5/1991 |
| JP | 04-186196 | | 7/1992 |
| JP | 05-052987 | | 3/1993 |
| JP | 06-311571 | | 11/1994 |
| JP | 10-326112 | | 12/1998 |
| JP | 2000-172327 | | 6/2000 |
| JP | 2001-236117 | | 8/2001 |
| JP | 2005050109 | A * | 2/2005 |
| JP | 2005-114516 | A | 4/2005 |
| JP | 2005316587 | A * | 11/2005 |

OTHER PUBLICATIONS

Notification of the Reasons for Refusal in JP 2007-043873 dated May 12, 2009, and an English Translation thereof.

* cited by examiner

*Primary Examiner* — Yubin Hung
(74) *Attorney, Agent, or Firm* — Buchanan Ingersoll & Rooney PC

(57) ABSTRACT

A monitoring and operation image integrating system include: a display signal synthesizing unit to which a display signal from a plurality of safety equipments and that from non-safety equipment are inputted, and which synthesizes a display signal from the plural safety equipments and a display signal from the non-safety equipment; display signal switching unit to which a state signal showing an operation state of whether or not each monitoring and operation screen image of the plural safety equipments displays an operating device of the equipment, is inputted, and which switches a display signal from a safety equipment to be synthesized by the display signal synthesizing unit based on the inputted state signals; and an integrated monitoring and operation screen display that displays a display signal synthesized by the display signal synthesizing unit as an integrated monitoring and operation screen of a plant.

11 Claims, 10 Drawing Sheets

MONITORING AND OPERATION IMAGE INTEGRATING SYSTEM OF PLANTS AND MONITORING AND OPERATION IMAGE INTEGRATING METHOD

BACKGROUND OF THE INVENTION

1. Field of the Invention

The present invention relates to systems for monitoring or operating plants that includes safety system equipment and non-safety system equipment with the use of images and, more particularly, to a monitoring and operation image integrating system of plants such as nuclear power plants that requires to have a high safety.

2. Description of the Related Art

In conventional plant monitoring and operation systems, to ensure safety of plants, separation is established between safety system equipment and non-safety system equipment, or monitoring function is separate from operating function.

From the viewpoint of such functional separation, an operation screen and monitoring screen of a system is separated, or a monitoring and operation screen of a safety system and a monitoring and operation screen of a non-safety system are physically separated.

In addition, the "safety system" refers to equipment capable of performing a function to immediately stop a nuclear reactor, to start the operation of engineering safety facilities, and thus to reliably obtain the safety of the power plant, for example, in the case of a nuclear power generation plant and at the time of occurrence of any abnormal transient change or danger of the plant.

The "non-safety system" refers to equipment for making normal start and stop, monitoring and control operations during output running and the like of the plant.

For example, the Japanese Patent Publication (unexamined) No. 114516/2005 discloses an "information providing device of a nuclear power plant comprising a first display to which information from systems forming a nuclear power plant is inputted, and which displays in a fixed way items of showing a safety state of the nuclear power plant at all times; a second display to which information from systems forming the nuclear power plant is inputted, and which displays an operation state of the entire nuclear power plant; a controller to which information from systems forming the nuclear power plant is input; and a third display functioning as operating means to which information is inputted from the mentioned controller to display individual operating states of the devices or apparatuses forming the nuclear power plant, and which outputs operation signals with respect to those devices and apparatuses to the controller.

That is, this Japanese Patent Publication (unexamined) No. 114516/2005 discloses a "plant monitoring and operation system" in which a monitoring and operation screen of a safety system and a monitoring and operation screen of a non-safety system are physically separated.

In such a conventional plant monitoring and operation system, individual displays (CRT, liquid crystal displays, and the like) for monitoring or controlling the operation of a plurality of safety system equipments and non-safety system equipment are required corresponding to each individual equipment.

As a result, a problem exists in a larger central control panel for monitoring or controlling (operating) the whole plant.

Moreover, a plant operator (plant manipulator) has to manipulate a large number of displays for the monitoring and operations, and thus another problem exists in heavy workload.

SUMMARY OF THE INVENTION

The present invention was made to solve the above-mentioned problems, and has an object of providing a monitoring and operation image integrating system of a plant in which a non-safety system and a safety system are functionally separated for obtaining safety, as well as a display image of non-safety system equipment and a display image of desired safety equipment are displayed on one monitoring and operation screen thus achieving high workability and compactness. The invention also provide a monitoring and operation image integrating method of a plant for actualizing such a plant monitoring and operation image integrating system.

A monitoring and operation image integrating system of a plant according to the invention is a system for monitoring or operating a plant that includes a plurality of safety system equipments and non-safety system equipment displaying a monitoring and operation screen image. This monitoring and operation image integrating system comprises:

display signal synthesizing means to which a display signal from the mentioned plurality of safety system equipments and a display signal from the mentioned non-safety system equipment are inputted, and which synthesizes one display signal from the mentioned plurality of safety system equipments and a display signal from the mentioned non-safety system equipment;

display signal switching means to which a state signal showing a display operation state of whether or not a monitoring and operation screen image of the mentioned plurality of safety system equipments displays an operating device of this equipment is inputted, and which switches a display signal from the safety system equipment that has to be synthesized by the mentioned display signal synthesizing means based on the plurality of state signals having been inputted; and an integrated monitoring and operation screen display that displays a display signal having been synthesized by the mentioned display signal synthesizing means as an integrated monitoring and operation screen of the plant.

A monitoring and operation image integrating method of a plant according to the invention is a method for monitoring or operating a plant that includes a plurality of safety system equipments and non-safety system equipment displaying a monitoring and operation screen image. This monitoring and operation image integrating method comprises:

a display signal synthesizing step in which a display signal from the plurality of safety system equipments and a display signal from the non-safety system equipment are inputted, and one display signal from the mentioned plurality of safety system equipments and a display signal from the mentioned non-safety system equipment are synthesized;

a display signal switching step in which a state signal showing a display operation state of whether or not a monitoring and operation screen image of the mentioned plurality of safety system equipments displays an operating device of the equipment is inputted, and a display signal from the safety system equipment that has to be synthesized in the mentioned display signal synthesizing step is switched based on a plurality of state signals having been inputted; and an integrated monitoring and operation screen displaying step in which a display signal having been synthesized in the mentioned display signal synthesizing step is displayed as an integrated monitoring and operation screen of the plant.

According to the invention, since the non-safety system and the safety system are functionally separated for ensuring safety, as well as a monitoring and operation screen image of the safety system equipment and a monitoring and operation screen image of the non-safety system equipment are integrated and displayed as one integrated monitoring and operation screen, a compact plant monitoring and operation image integrating system or monitoring and operation image integrating method of high workability in monitoring task and operation task can be achieved. Consequently, workload on a plant operator can be reduced.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
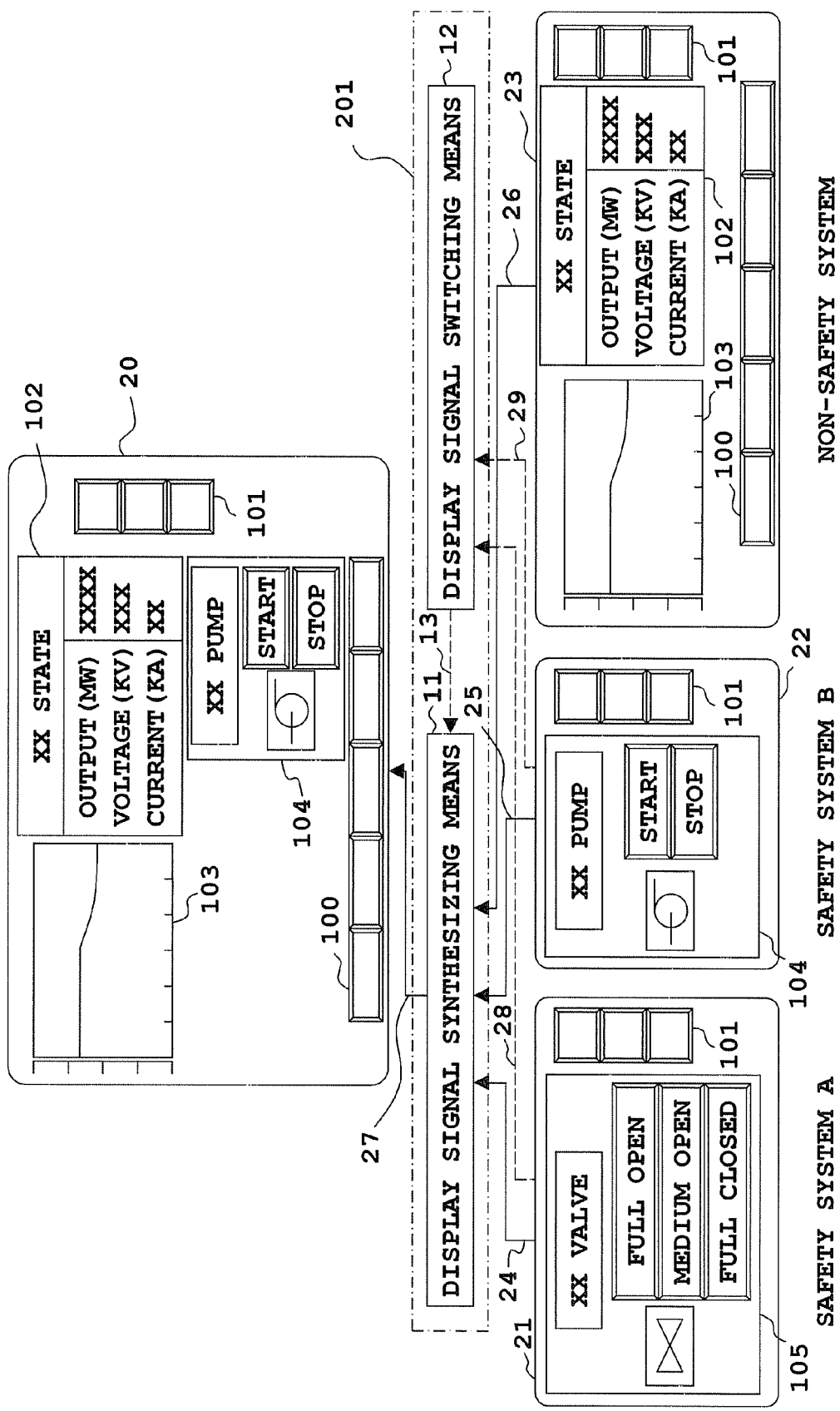
FIG. 1 is a diagram schematically illustrating arrangement of a monitoring and operation image integrating system of a plant according to a first preferred embodiment of the invention.

Several preferred embodiments according to the present invention are hereinafter described with reference to the accompanying drawings.

In the drawings, the same reference numerals indicate the same or like parts.

Embodiment 1

FIG. 1 is a diagram schematically illustrating an arrangement of a plant monitoring and operation image integrating system according to a first embodiment of the invention.

As illustrated in FIG. 1, a display signal synthesizer 201 is constructed of: display signal synthesizing means 11 for synthesizing a display signal (image signal) from a plurality of safety systems (for example, a safety system A and a safety system B) and a display signal (image signal) from a non-safety system equipment; and display signal switching means 12 for switching a display signal from the safety system equipment that has to be displayed based on the below-described state signal from a plurality of safety system equipments.

Furthermore, through a signal line, a display switching signal 13 is transmitted from the display signal switching means 12 to the display signal synthesizing means 11.

In addition, as mentioned above, the "safety system" refers to equipment capable of performing a function to immediately stop a nuclear reactor, to start the operation of engineering safety facilities at the time of occurrence of any abnormal transient change or danger of the plant, thus reliably ensuring the safety of the power plant.

The "non-safety system" refers to equipment for making normal start and stop, monitoring and control operations during output running and the like of the plant.

Further, the "safety system" refers to safety system equipment, and "non-safety system" refers to non-safety system equipment.

FIG. 1 illustrates an example in which there are two safety series of safety system A and safety system B.

An image signal of a monitoring and operation screen image 21 of the safety system A is inputted to a display signal synthesizer 11 as a display signal 24 from the safety system A.

Likewise, an image signal of a monitoring and operation screen image 22 of the safety system B is inputted to the display signal synthesizer 11 as a display signal 25 from the safety system B.

Further, an image signal of a monitoring and operation screen image 23 of the non-safety system is also inputted to the display signal synthesizer 11 as a display signal 26 from the non-safety system.

That is, a display signal (image signal) from two safety series of the safety system A and the safety systems B and a display signal (image signal) from the non-safety system are inputted to the display signal synthesizing means 11.

Further, a state signal 28 from the safety system A and a state signal 29 from the safety system B are inputted to display signal switching means 12.

Herein, the state signal from the safety system A and the safety system B is a signal indicating a state of whether or not an image of any operating device (for example, a pump operating switch 104, or a valve operating switch 105) is being displayed in a monitoring and operation screen image of each safety system.

When any operating device image is being displayed on a monitoring and operation screen of the safety system, the operating device image is displayed with superimposed on the integrated monitoring and operation screen image. On the other hand, when any operating device image is not being displayed (that is, a menu screen is being displayed), no operating device image is displayed with superimposed on the integrated monitoring and operation screen image.

For example, in the case where a menu screen is being displayed on the monitoring and operation screen of the safety system A and any operating device image is being displayed on the monitoring and operation screen of the safety system B, the operating device image of the safety system B is superimposed on the integrated monitoring and operation screen (as described later).

In the case where any operating device image is being displayed on the monitoring and operation screen of the safety system A and a menu screen is being displayed on the monitoring and operation screen of the safety system B, the operating device image of the safety system A is superimposed on the integrated monitoring and operation screen.

In the case where any operating device image is being displayed on the monitoring and operation screens of both safety system A and safety system B, the images of the operating devices are not superimposed (that is, the images are not synthesized) on the integrated monitoring and operation screen, but an error signal is outputted.

The display signal switching means 12 compares a state signal 28 from the safety system A with a state signal 29 from the safety system B, and based on the comparison result, transmits a display switching signal 13 to the display signal synthesizing means 11 to command which display signal between the display signal 24 from the safety system A and the display signal from the safety system B is to be synthesized with the display signal 26 from the non-safety system.

The display signal synthesizing means 11, based on a command (that is, a display switching signal 13) from the display signal switching means 12, makes a synthesis (integration) of a display signal from the safety system A or the safety system B and a display signal from the non-safety system, and outputs a final display signal 27 to be displayed on an integrated monitoring and operation screen 20.

That is, the integrated monitoring and operation screen 20 is a screen for displaying a display signal (image signal) from the safety system A or the safety system B and a display signal (image signal) from the non-safety system being synthesized with each other.

FIG. 1 shows the case where a display signal 26 from the non-safety system and a display signal 25 from the safety system B are synthesized, and a final display signal 27 having been synthesized is displayed on the integrated monitoring and operation screen 20.

In other words, on the integrated monitoring and operation screen 20, using the monitoring and operation screen image 23 of the non-safety system to be displayed with the display signal 26 taken as a base, the monitoring and operation screen image 22 of the safety system B (image of a pump operating switch 104 in the example of FIG. 1) to be displayed with a display signal 25 is synthesized.

Furthermore, as to the integrated monitoring and operation screen 20, layout position or size of any image of the pump operating switch 104 of the safety system B is set as appropriately so that a plant operator may make monitoring and operations with ease.

Additionally, in the drawing, reference numeral 100 designates a horizontal-type screen selecting button, numeral 101 designates a vertical-type screen selecting button, numeral 102 designates a digital display of plant parameters, numeral 103 designates a trend display of plant parameters, numeral 104 designates a pump operating switch, and numeral 105 designates a valve operating switch.

Now, operations are hereinafter described.

A monitoring and operation screen image 21 of the safety system A, a monitoring and operation screen image 22 of the safety system B, and a monitoring and operation screen image 23 of the non-safety system are converted to a display signal 24, a display signal 25, and a display signal 26 respectively to be transmitted to the display signal synthesizing means 11.

Further, a state signal 28 of the safety system A and a state signal 29 of the safety system B are transmitted to the display signal switching means 12.

The display signal switching means 12, based on the state signal 28 from the safety system A and the state signal 29 from the safety system B, generates a display switching signal 13 indicating which safety system screen is to be displayed, and outputs the display switching signal 13 having been generated to the display signal synthesizing means 11.

Based on the display switching signal 13, the display signal synthesizing means 11 cuts out information of an operating device image 104 to be displayed, for example, from the monitoring and operation screen image 22 of the safety system B, makes a suitable image processing such as enlargement or shrinkage, makes a synthesis processing with the monitoring and operation screen image 23 of the non-safety system, and generates and outputs this synthesized information as a display signal 27 to obtain a final integrated monitoring and operation screen 20 with a display not illustrated.

On the integrated monitoring and operation screen 20, based on a display information of the monitoring and operation screen image 23, screen selecting buttons being horizontal-type screen selecting buttons 100 and vertical-type screen selecting buttons 101, process parameters of a digital display 102 of plant parameters and a trend display 103 of plant parameters are displayed, and furthermore, based on the display information of the monitoring and operation screen image 22 of the safety system B, a pump operating switch 104 is displayed.

Now, processing at display signal synthesizing means 11 is described in detail.

The display signals 24, 25 and 26 (image signals) having been inputted to the display signal synthesizing means 11 are inputted to an input image memory (not shown) provided in the display signal synthesizing means (image synthesizing means) 11, and synthesized to be a display signal 27 displayed on the integrated monitoring and operation screen 20.

Basically, a display signal (image signal) 26 from the monitoring and operation screen image 23 of the non-safety system is selected as a basic image (base image), and copied into an output image memory (not illustrated).

Further, based on the display switching signal 13 to be transmitted through a signal line from the display signal switching means 12, processing of input screen and device layout information of the safety system is made to perform enlargement or shrinkage thereof.

Thereafter, by copying information of an input image memory into an output image memory, an image synthetic processing (that is, an image integrated processing) is made to synthesize a monitoring and operation screen image of the non-safety system and a monitoring and operation screen image of the safety system selected with a switching signal from display signal switching means 12 (a display image of the safety system B in the example of FIG. 1).

As a result, a display image of the non-safety system equipment and a display image of the selected safety system equipment (for example, a display image of the safety system B) are synthesized to be an integrated monitoring and operation screen 20.

A plant operator, using this integrated monitoring and operation screen 20, can monitor or operate a plant easily as well as suitably.

Additionally, although the safety system formed of two series (that is, the safety system A and the safety system B) is described in the above-described description as illustrated in FIG. 1, it is preferable to be of any plural series number of safety systems.

As described above, a monitoring and operation image integrating system of a plant according to this first embodiment is a system for monitoring or operating a plant that includes a plurality of safety system equipments (for example, safety system equipment A and safety system equipment B) and non-safety system equipment displaying a monitoring and operation screen image.

This monitoring and operation image integrating system includes: display signal synthesizing means 11 to which a display signal (for example, a display signal 24, 25) from the mentioned plurality of safety system equipments and a display signal 26 from the mentioned non-safety system equipment are inputted, and which synthesizes one display signal from the plurality of safety system equipments and a display signal 26 from the non-safety system equipment; display signal switching means 12 to which any state signal (for example, a state signal 28, 29) showing an operation state of whether or not a monitoring and operation screen image of the plurality of safety system equipments displays an operating device is inputted, and which switches a display signal from the safety system equipment that has to be synthesized by the display signal synthesizing means 11 based on the plurality of state signals having been inputted; and an integrated monitoring and operation screen display (not illustrated) that displays a display signal having been synthesized by the display signal synthesizing means 11 as an integrated monitoring and operation screen 20 of the plant.

Further, a monitoring and operation image integrating method of a plant according to this first embodiment is a method for monitoring or operating a plant that includes a plurality of safety system equipments (for example, safety system equipment A and safety system equipment B) and non-safety system equipment displaying a monitoring and operation screen image.

This monitoring and operation image integrating method includes: a display signal synthesizing step in which a display signal from the plurality of safety system equipments and a display signal from a non-safety system equipment are input, and one display signal (for example, a display signal 24 or a display signal 25) from the plurality of safety system equipments and a display signal 26 from the non-safety system equipment are synthesized;

a display signal switching step in which a state signal (for example, a state signal 28, 29) showing an operation state of whether or not a monitoring and operation screen image of a plurality of safety system equipments displays an operating device is inputted, and a display signal from the safety system equipment that has to be synthesized in the display signal synthesizing step is switched based on a plurality of state signals having been inputted; and an integrated monitoring and operation screen displaying step in which a display signal having been synthesized in the display signal synthesizing step is displayed as an integrated monitoring and operation screen of the plant.

A monitoring and operation image integrating method of a plant according to this first embodiment further includes an operating position signal outputting step in which an operating position signal of an operation input with respect to an operating device on a synthesized image is sorted and outputted to any equipment outputting an image signal on each corresponding monitoring and operation screen.

Accordingly, although plural screens of non-safety system and safety system have been displayed respectively with the use of plural displays according to the prior art, in this first embodiment, a monitoring and operation screen image of the safety system and a monitoring and operation screen image of the non-safety system can be synthesized (integrated) to be displayed as one integrated monitoring and operation screen 20.

As a result, according to this first embodiment, while the functions of the non-safety system and the safety system being divided, a compact plant monitoring and operation image integrating system with a few displays can be obtained, thus enabling to reduce workload on a plant operator.

Embodiment 2

Figure 2:
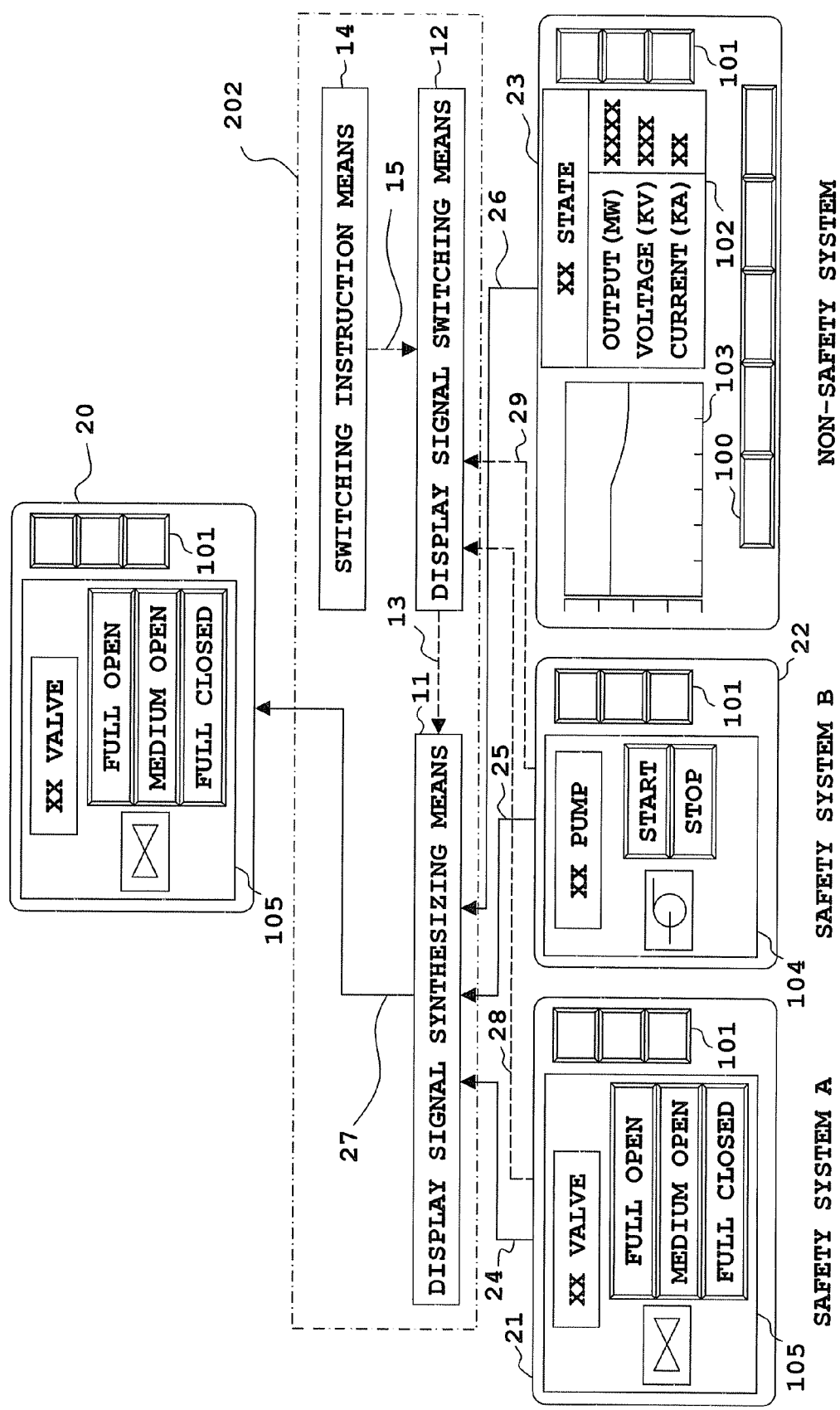
FIG. 2 is a diagram schematically illustrating arrangement of a monitoring and operation image integrating system of a plant according to a second embodiment.

FIG. 2 is a diagram schematically illustrating an arrangement of a monitoring and operation image integrating system of a plant according to a second embodiment.

A display signal synthesizer 202 according to this second embodiment is characterized in that switching instruction means 14 is further provided in the display signal synthesizer 201 described in the foregoing first embodiment.

This switching instruction means 14, irrespective of a state signal from the plurality of safety system equipments, causes a display switching signal 13, with which a display signal from desired safety system equipment is selected, to be outputted from the display signal switching means 12 to the display signal synthesizing means 11.

The switching instruction means 14 is switching instruction means for manually indicating a display of the safety system equipment, and is executed with the use of a hardware switch.

Furthermore, a switching instruction signal 15 is outputted from the switching instruction means 14, and the switching instruction signal 15 is transmitted to the display signal switching means 12.

Now, with reference to FIG. 2, typical operations of the monitoring and operation image integrating system of a plant according to this second embodiment are described.

The switching instruction means 14 is provided only for switching to a safety system, e.g., in the case of failure of the non-safety system, to make a stop operation of the plant. This switching instruction means 14 is formed of a hardware switch.

A plant operator, by switching instruction means 14, being a hardware switch, specifies which monitoring and operation screen of safety system equipment among a plurality of safety system equipments is to be displayed.

Now description is made on the assumption that a safety system A is selected and indicated by the switching instruction means 14.

When the display of a safety system A is selected by the switching instruction means 14, this information is transmitted to the display signal switching means 12 as a switching instruction signal 15, and further a display switching signal 13 is transmitted from the display signal switching means 12 to the display signal synthesizing means 11.

In the display signal synthesizing means 11, only a display signal of the safety system A is selected due to the display switching signal 13 from the display signal switching means 12, and no synthesis thereof with a monitoring and operation screen image 23 of the non-safety system is made, thus a monitoring and operation screen image 21 of the safety system A being outputted as it is.

Additionally, in the case of no input from the switching instruction means 14 (that is, there is no switching instruction signal 15), exactly the same operations as the monitoring and operation image integrating system of the plant in the foregoing first embodiment are made.

As described above, in the monitoring and operation image integrating system of a plant according to this second embodiment, the switching instruction means 14 is provided for inputting to the display signal switching means 12 a switching instruction signal 15 that causes to select a display signal from desired safety system equipment. The display signal switching means 12, irrespective of a state signal from a plurality of safety system equipments, inputs a display switching signal 13 to the display signal synthesizing means 11 based on the switching instruction signal 15 inputted from the switching instruction means 14. The display signal synthesizing means 11 displays on the integrated monitoring and operation screen 20 only the display signal from safety system equipment corresponding to the display switching signal outputted from the display signal switching means 12.

As a result, according to this second embodiment, there is an advantage such that the integrated monitoring and operation screen can be utilized as a safety system dedicated screen.

Embodiment 3

Figure 3:
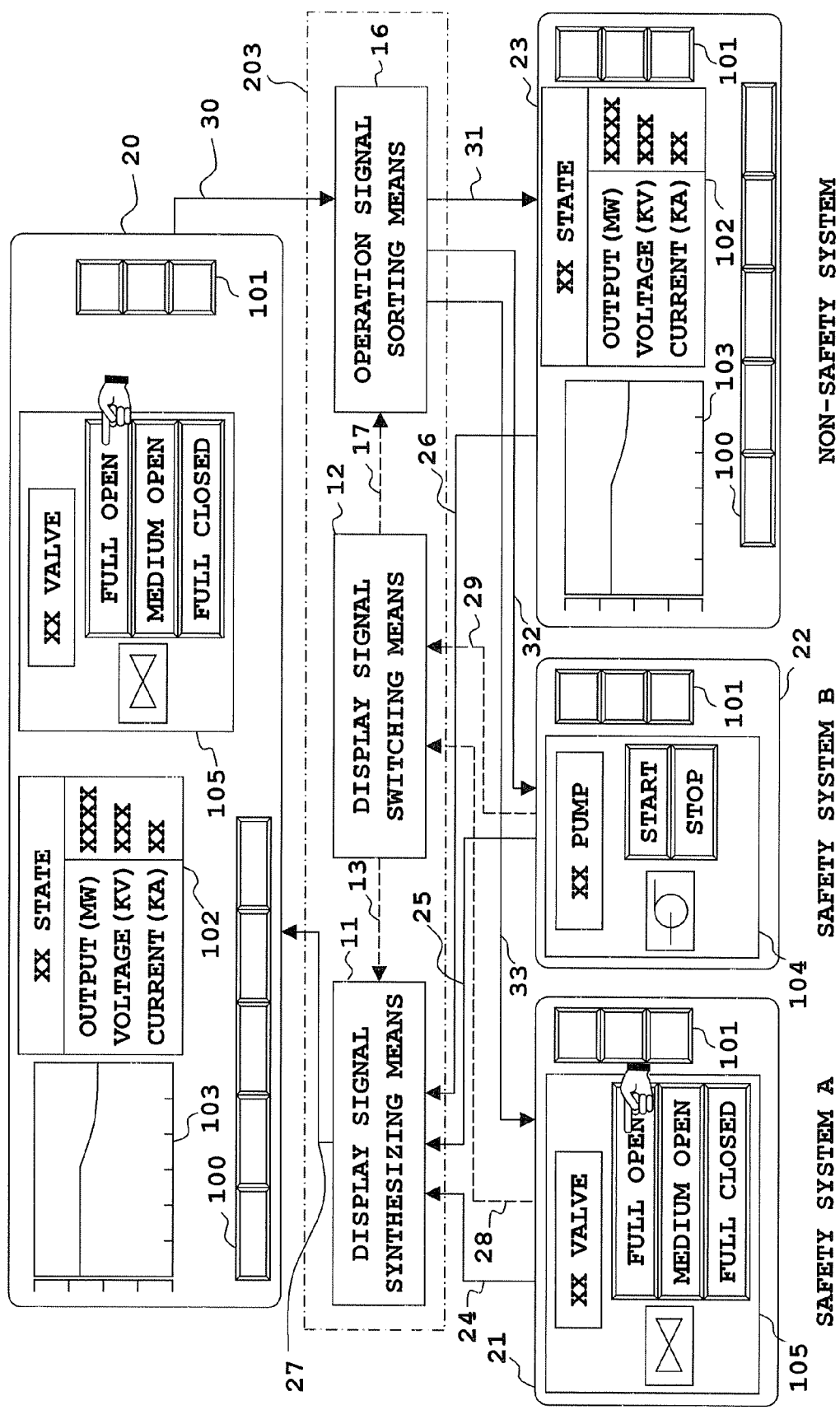
FIG. 3 is a diagram schematically illustrating arrangement of a monitoring and operation image integrating system of a plant according to a third embodiment.

FIG. 3 is a diagram schematically illustrating an arrangement of a monitoring and operation image integrating system of a plant according to a third embodiment.

A display signal synthesizer 203 according to this third embodiment is characterized in that operation signal sorting means 16 is further provided in the display signal synthesizer 201 described in the foregoing first embodiment.

In the drawing, reference numeral 17 is a signal for obtaining information about from which safety system equipment a display signal is synthesized.

Furthermore, reference numeral 30 designates an operating position signal on the integrated monitoring and operation screen 20, numeral 31 designates an operating position signal to be inputted to the non-safety system, numeral 32 designates an operating position signal to be inputted to the safety system B, and numeral 33 designates an operating position signal to be inputted to the safety system A.

In addition, although a signal input for sorting operating position signals is made from the safety system, no signal input for sorting operating position signals is made from the non-safety system.

In the case of no sorting to the safety system, all operating position signals are outputted to the non-safety system as they are.

Now, operations are described.

Supposing that an operating device of the safety system A (a valve operating switch 105) is displayed, an example is hereinafter described.

Operations of the display signal synthesizing means 11 and the display signal switching means 12 are the same as in the foregoing first embodiment.

When a button of the valve operating switch 105 (for example, "full open" button indicated by the hand mark) is selected on the integrated monitoring and operation screen 20, position coordinates thereof (that is, position coordinates of "full open" button) are transmitted to the operation signal sorting means 16 as an operating position signal 30.

Additionally, a hand mark in the drawing illustrates an image of a manipulator (operator) that makes a touch operation of the operating device. When the operator makes a touch operation of a portion of the hand mark on the integrated monitoring and operation screen 20, a touch signal thereof is transmitted to a computer displaying a corresponding screen by the operation signal sorting means 16, and processed as an operating position signal corresponding to the place of the operating device displaying the corresponding screen thereof.

In the operation signal sorting means 16, with a signal 17 showing which safety system screen is cut out and synthesized, it is determined that, to which region of the image of the safety system or of the image of the non-safety system, the position coordinate information (operating position signal 30) having been inputted from the integrated monitoring and operation screen 20 is correspondent.

With the signal 17 from display signal switching means 12, it can be determined that, at what coordinate position on the integrated monitoring and operation screen 20, the image having been cut out from the monitoring and operation screen image of the safety system is displayed.

Accordingly, the position coordinate information (operating position signal 30) having been inputted from the integrated monitoring and operation screen 20 belongs to whether the image cut out from the safety system or the image from the non-safety system, can be determined.

Furthermore, the operation signal sorting means 16 determines which position of the image on a safety system screen is cut out based on the signal 17 from display signal switching means 12; and in the case of making enlargement or shrinkage of the image on the original safety system screen, with the use of a ratio at the time of making the enlargement or shrinkage, a coordinate position in the case of being converted to a screen position of the original safety system screen is computed, and the position coordinate information (operating position signal 30) having been inputted from the integrated monitoring and operation screen 20 is transmitted to a monitoring and operation screen image of the corresponding system (safety system A in this case) via a signal line 33.

As described above, in the monitoring and operation image integrating system of a plant according to this third embodiment, the display signal switching means 12 outputs the signal 17 showing from which safety system equipment a display signal is synthesized on the integrated monitoring and operation screen 20; and there is further provided the operation signal sorting means 16 for sorting and outputting the operating position signal 30 on the integrated monitoring and operation screen 20 to a corresponding equipment of a plurality of safety system equipments and non-safety system equipment.

As a result, according to this third embodiment, there is an advantage such that operating position coordinate information from the integrated monitoring and operation screen can be correctly transmitted to the non-safety system.

Embodiment 4

Figure 4:
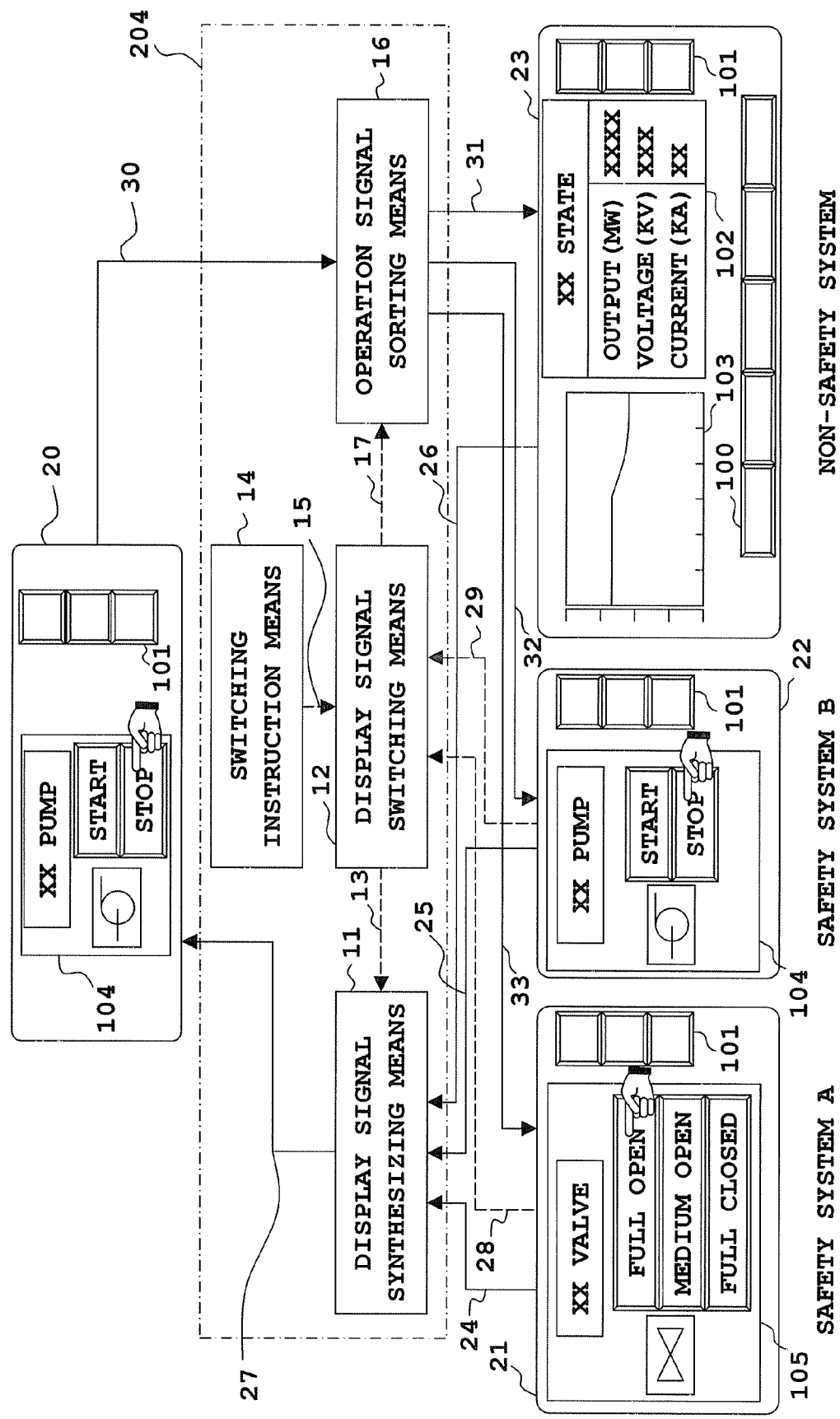
FIG. 4 is a diagram schematically illustrating arrangement of a monitoring and operation image integrating system of a plant according to a fourth embodiment.

FIG. 4 is a diagram schematically illustrating an arrangement of a monitoring and operation image integrating system of a plant according to a fourth embodiment.

A display signal synthesizer 204 according to this fourth embodiment is characterized in that switching instruction means 14 is further provided in the monitoring and operation image integrating system of a plant according to the foregoing third embodiment.

Except for the provision of switching instruction means 14, this fourth embodiment is basically the same as the third embodiment.

Furthermore, the operations of display signal synthesizing means 11 and display signal switching means 12 are the same as those in the foregoing second embodiment.

Supposing that the safety system B is selected by switching instruction means 14, an example is hereinafter described.

When a button of an operating device (for example, "stop" button) is selected on the integrated monitoring and operation screen 20, position coordinates thereof are transmitted to the operation signal sorting means 16 as an operating position signal 30.

From the display signal switching means 12 to the operation signal sorting means 16, a signal 17 representing that which safety system screen is cut out and synthesized is outputted.

With this signal 17, the operation signal sorting means 16 determines that the operating position signal 30 having been inputted from the integrated monitoring and operation screen 20 is of the safety system B, corrects the position coordinate information, and transmits this corrected information via a signal line 33 to the monitoring and operation screen image 22 of the corresponding system (safety system B in this case).

Additionally, in the case where any safety system is not selected by the switching instruction means 14, the operation of this fourth embodiment will be the same as that of the foregoing third embodiment.

As described above, in the monitoring and operation image integrating system of a plant according to this fourth embodiment, there is further provided switching instruction means 14 for inputting to the display signal switching means 12 a switching instruction signal 15 causing to select a display signal from a desired safety system equipment irrespective of a state signal from the plurality of safety system equipments.

As a result, according to this fourth embodiment, there is an advantage such that even in the case where the non-safety system cannot be used, operation information from the integrated monitoring and operation screen can be correctly transmitted to the safety system.

Embodiment 5

Figure 5:
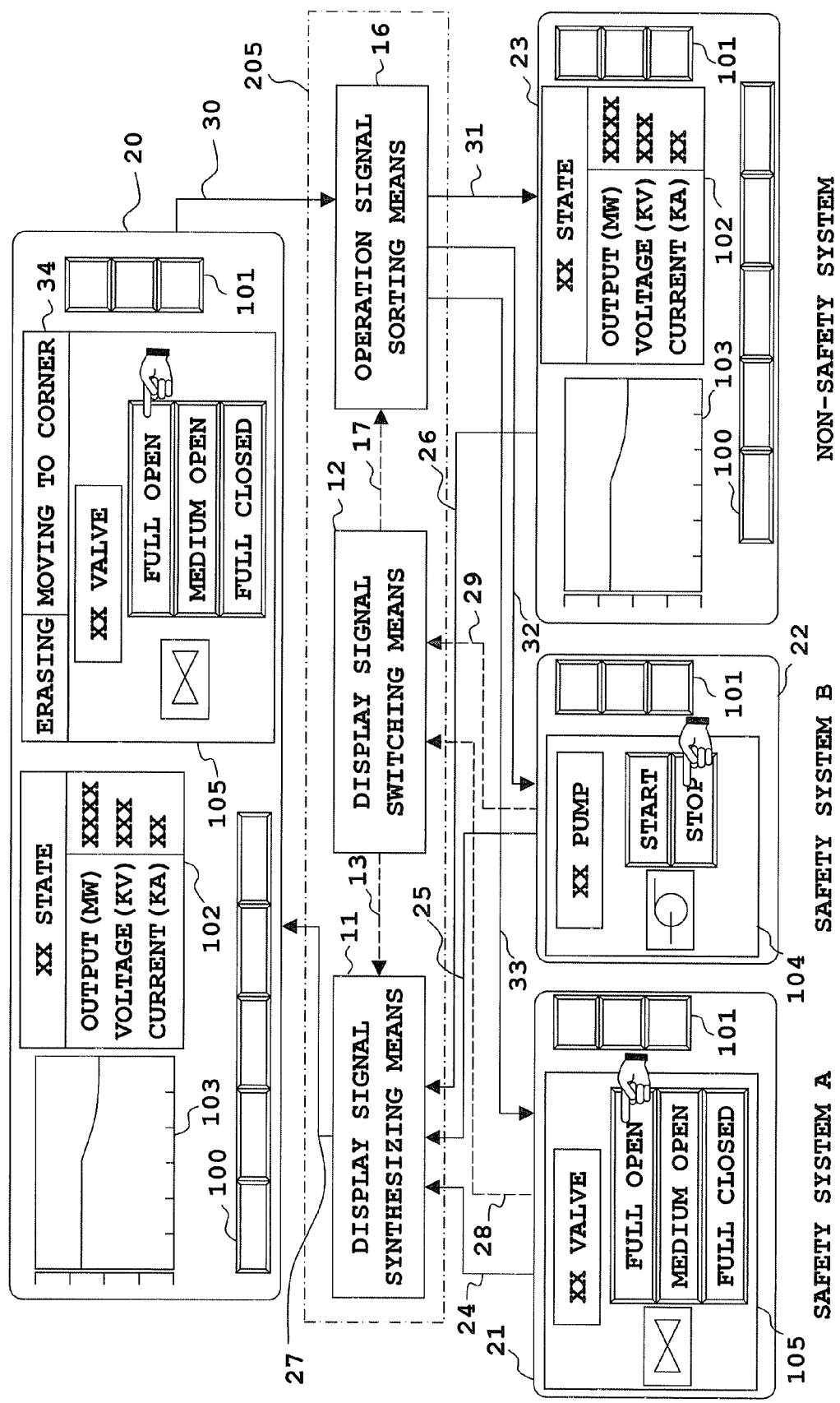
FIG. 5 is a diagram schematically illustrating arrangement of a monitoring and operation image integrating system of a plant according to a fifth embodiment.

FIG. 5 is a diagram schematically illustrating an arrangement of a monitoring and operation image integrating system of a plant according to a fifth embodiment.

The monitoring and operation image integrating system of a plant according to this fifth embodiment is characterized in that image moving/erasing means for moving or erasing an image of safety system equipment displayed on the integrated monitoring and operation screen 20 is further provided in the monitoring and operation image integrating system of a plant according to the foregoing third embodiment.

Supposing that the safety system A (valve operating switch 105) is displayed, an example is hereinafter described.

In addition, a display signal synthesizer 205 is formed of the display signal synthesizing means 11, display signal switching means 12, and operation signal sorting means 16, and operations thereof are the same as those in the foregoing third embodiment.

When a button of an operating device ("full open" in this example) is selected on the integrated monitoring and operation screen 20, position coordinates thereof are transmitted to the operation signal sorting means 16 as an operating position signal 30.

From the display signal switching means 12 to the operation signal sorting means 16, a signal 17 representing that which safety system screen is cut out and synthesized is outputted.

With this signal 17, the operation signal sorting means 16 determines that the position coordinates of the operating position signal 30 having been inputted from the integrated monitoring and operation screen 20 is of the safety system A, corrects the position coordinate information, and transmits this corrected information via a signal line 33 to the monitoring and operation screen image 22 of the corresponding system (safety system B in this case).

In this fifth embodiment, "moving to corner and erasing button 34", being image moving/erasing means that is produced in the display signal synthesizing means 11, is displayed on the image of an operating device 105 being displayed on an integrated monitoring and operation screen 20.

In addition, by selection and operation of "moving to corner" of "moving to corner and erasing button 34", the image of the operating device 105 and the image of "moving to corner and erasing button 34" are moved to another position on the integrated monitoring and operation screen 20 (for example, in the case of moving to corner, to four corners of the integrate monitoring and operation screen 20).

Furthermore, by selection and operation of "erasing button", the image of an operating device 105 can be erased.

By erasing the image of the operating device 105, an image hidden under the image of the operating device 105 can be seen on the integrated monitoring and operation screen 20.

Moreover, based on moving or erasing of the image of the operating device, the coordinates of a position of the operating device 105 being displayed on the integrated monitoring and operation screen 20 are changed.

Also in this case, the coordinates of an operating position signal to be outputted to each monitoring and operation screen image 21, 22, 23 should not to be affected by the change.

Therefore, when an operating position signal is sorted by the operation signal sorting means 16 responsive to the movement of an image of the operating device 105, a coordinate positional signal to be outputted to each monitoring and operation screen image 21, 22, 23 is modified using a coordinate position on the integrated monitoring and operation screen 20 of the operating device 105.

Thus, the coordinate position of the operation signal to be outputted to each monitoring and operation screen image 21, 22, 23 is not affected.

As described above, in the monitoring and operation image integrating system of a plant according to this fifth embodiment, the mentioned monitoring and operation image integrating system of a plant according to the foregoing third embodiment is further provided with image moving/erasing means for moving or erasing an image of safety system equipment being displayed on the integrated monitoring and operation screen 20.

As a result, according to this fifth embodiment, even in the case where any image of an operating device of the safety system is superimposed on the display of information of the non-safety system and thus information of the non-safety system cannot be seen, the image of an operating device of the safety system displayed in the superimposed manner can be moved or erased, and thus the operation information from the integrated monitoring and operation screen can be correctly transmitted to the safety system.

Embodiment 6

Figure 6:
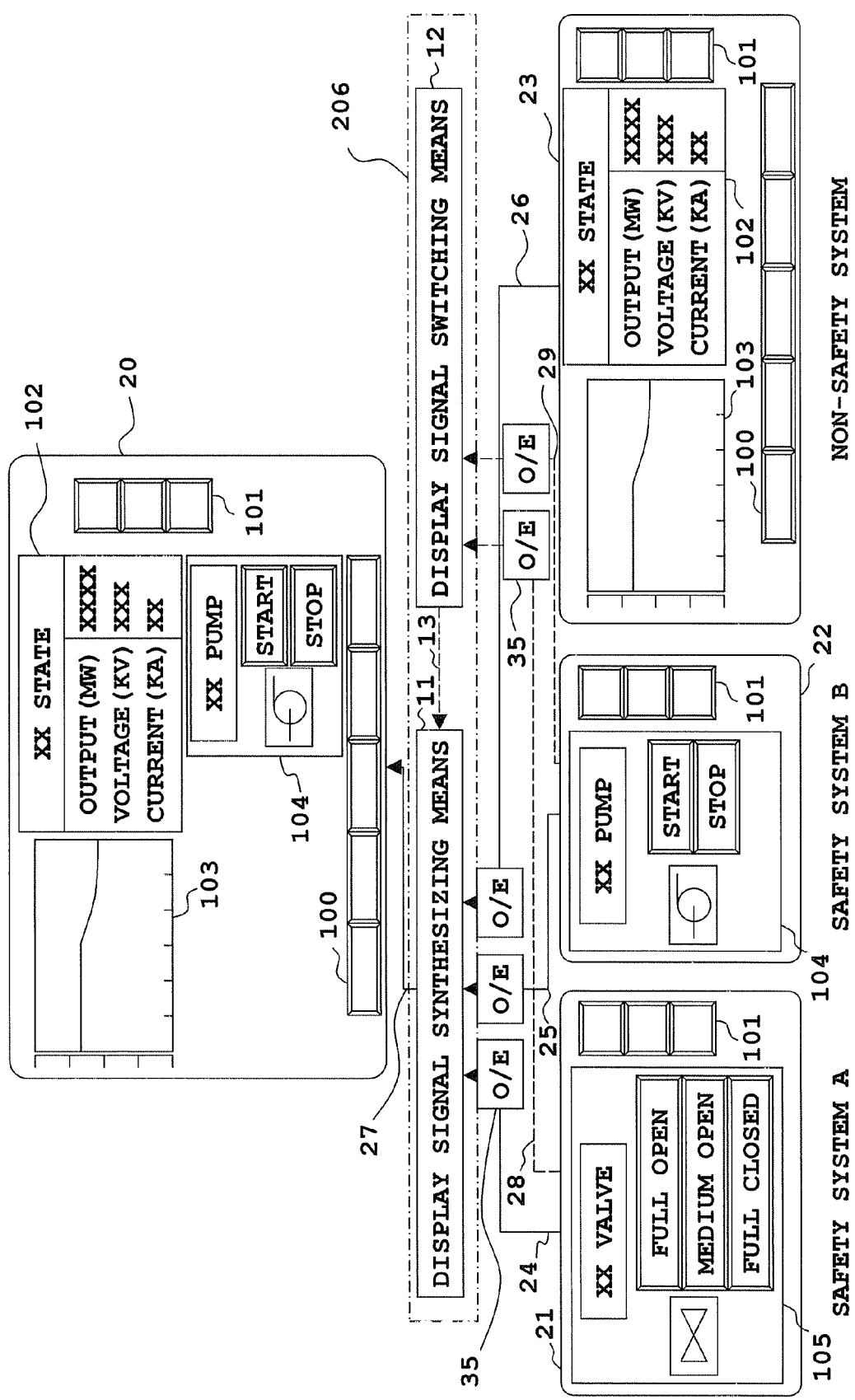
FIG. 6 is a diagram schematically illustrating arrangement of a monitoring and operation image integrating system of a plant according to a sixth embodiment.

FIG. 6 is a diagram schematically illustrating an arrangement of a monitoring and operation image integrating system of a plant according to a sixth embodiment.

The monitoring and operation image integrating system according to this sixth embodiment is characterized in that the monitoring and operation image integrating system according to the foregoing first embodiment is further provided with O/E converters for converting a display signal from a plurality of safety system equipments, a display signal from a non-safety system equipment, and a state signal from the plurality of safety system equipments into optical signals, and outputting each optical signal having been converted to each corresponding display signal synthesizing means or display signal switching means via the optical fibers.

The basic arrangement and operations of a display signal synthesizer 206 according to this sixth embodiment are the same as those of the display signal synthesizer 201 according to the foregoing first embodiment.

In this sixth embodiment, all signal input/output cables with the safety system A, the safety system B and the non-safety system are of optical fibers, and signals are inputted through the O/E (Optic/Electric) converters, whereby not only the safety system and the non-safety system are functionally separated but also the safety system and the non-safety system are electrically separated.

As described above, in the monitoring and operation image integrating system of a plant according to this sixth embodiment, the monitoring and operation image integrating system of a plant according to the above-described first embodiment is further provided with the O/E converter 35 that converts a display signal from a plurality of safety system equipments and a display signal from the non-safety system equipment, and a state signal from the plurality of safety system equipments into an optical signal, and that outputs each optical signal having been converted to each corresponding display signal synthesizing means 11 or display signal switching means 12 via the optical fibers.

As a result, according to this sixth embodiment, in addition to the advantages of the foregoing first embodiment, further, the safety system and the non-safety system are electrically separated from the display signal synthesizing means and the display signal switching means, so that reliability of the monitoring and operation image integrating system of the plant can be enhanced.

Embodiment 7

Figure 7:
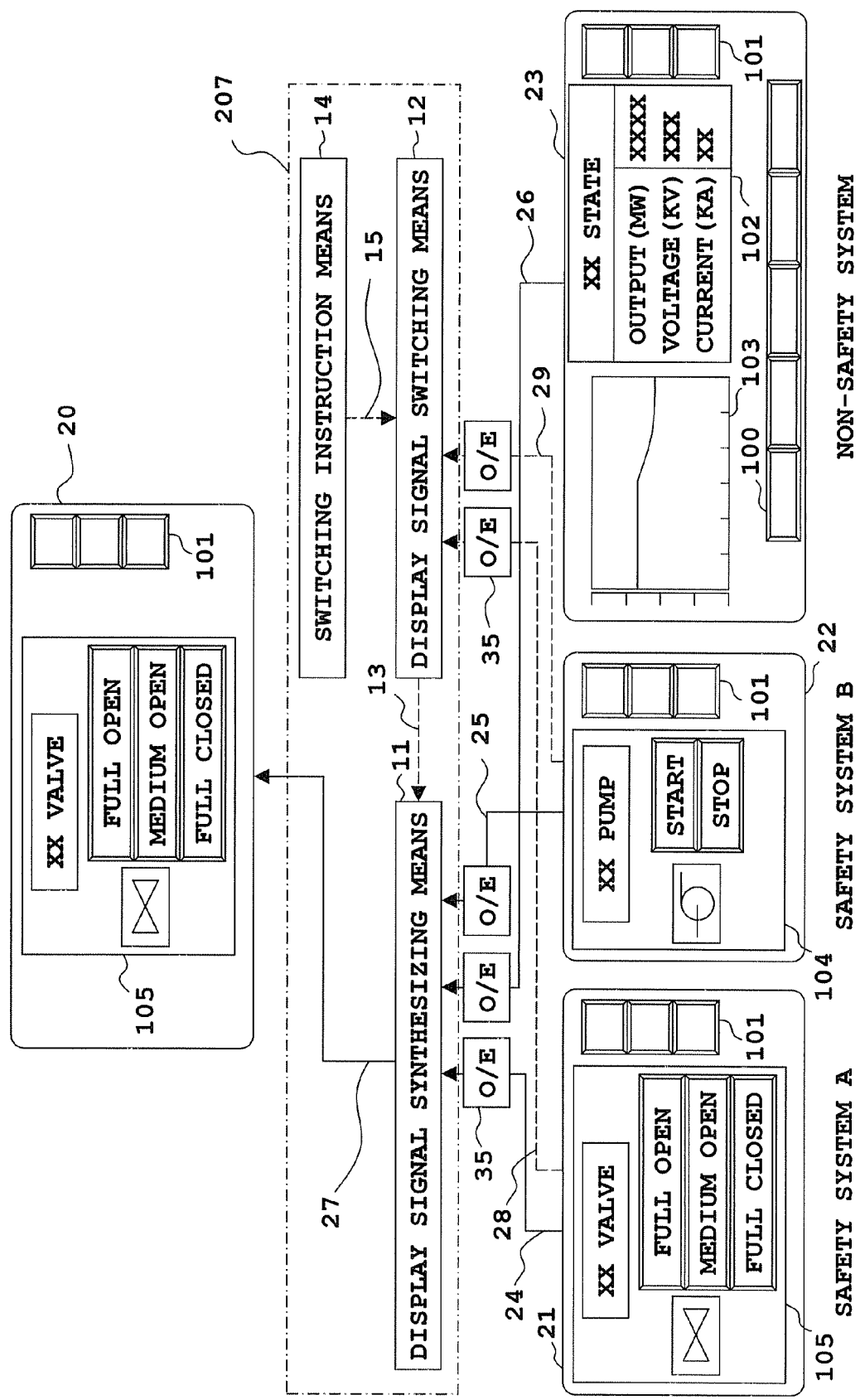
FIG. 7 is a diagram schematically illustrating arrangement of a monitoring and operation image integrating system of a plant according to a seventh embodiment.

FIG. 7 is a diagram schematically illustrating an arrangement of a monitoring and operation image integrating system of a plant according to a seventh embodiment.

The monitoring and operation image integrating system of a plant according to this seventh embodiment is characterized in that the monitoring and operation image integrating system according to the foregoing second embodiment is further provided O/E converters for converting a display signal from a plurality of safety system equipments and a display signal from a non-safety system equipment and a state signal from the plurality of safety system equipments into optical signals, and outputting each optical signal having been converted to each corresponding display signal synthesizing means or display signal switching means via the optical fibers.

The basic arrangement and operation of a display signal synthesizer 207 according to this seventh embodiment are the same as those of the display signal synthesizer 202 according to the second embodiment.

In this seventh embodiment, all signal input/output cables with the safety system A, the safety system B and the non-safety system are of optical fibers, and signals are inputted through O/E (Optic/Electric) converters, whereby not only the safety system and the non-safety system are functionally separated but also the safety system and the non-safety system are electrically separated.

As described above, in the monitoring and operation image integrating system of a plant according to this seventh embodiment, the monitoring and operation image integrating system of a plant according to the foregoing second embodiment is further provided with an O/E converter 35 that converts a display signal from a plurality of safety system equipments and display signal from a non-safety system equipment and a state signal from the plurality of safety system equipments into an optical signal, and that outputs each optical signal having been converted to each corresponding display signal synthesizing means 11 or display signal switching means 12 via the optical fibers.

As a result, according to this seventh embodiment, in addition to the advantages of the foregoing second embodiment, further, the safety system and the non-safety system are electrically separated from the display signal synthesizing means and the display signal switching means, so that reliability of the monitoring and operation image integrating system of a plant can be enhanced.

Embodiment 8

Figure 8:
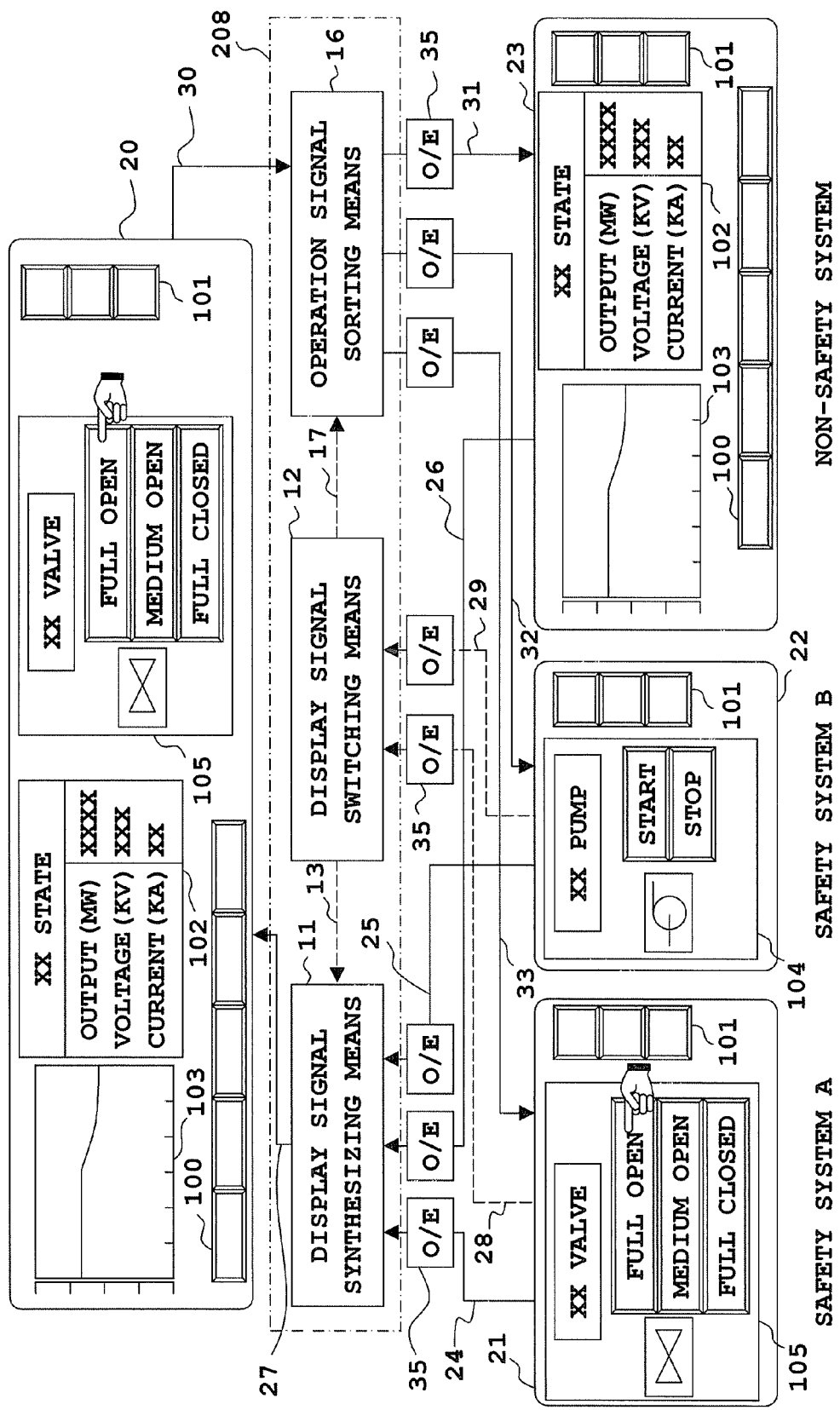
FIG. 8 is a diagram schematically illustrating arrangement of a monitoring and operation image integrating system of a plant according to an eighth embodiment.

FIG. 8 is a diagram schematically illustrating an arrangement of an monitoring and operation image integrating system of a plant according to an eighth embodiment.

The basic arrangement and operation of a display signal synthesizer 208 according to this eighth embodiment are the same as those of the display signal synthesizer 203 according to the foregoing third embodiment.

In this eighth embodiment, all signal input/output cables with the safety system A, the safety system B and the non-safety system are of optical fibers, and signals are inputted through O/E (Optic/Electric) converters, whereby not only the safety system and the non-safety system are functionally separated but also the safety system and the non-safety system are electrically separated.

The monitoring and operation image integrating system according to this eighth embodiment is characterized in that the monitoring and operation image integrating system according to the foregoing third embodiment is further provided with O/E converters for converting to optical signals a display signal from a plurality of safety system equipments, a display signal from non-safety system equipment, a state signal from the plurality of safety system equipments, and an operating position signal from operation signal sorting means, and outputting each optical signal having been converted to each corresponding display signal synthesizing means, display signal switching means, or the safety system equipment/non-safety system equipment via the optical fibers.

In other words, in the monitoring and operation image integrating system of a plant according to this eighth embodiment, the display signal switching means 12 in the monitoring and operation image integrating system of a plant according to the foregoing sixth embodiment outputs a signal 17 indicating that a display signal from which safety system equipment is synthesized on the integrated monitoring and operation screen 20; and there is provided operation signal sorting means 16 for sorting and outputting an operating position signal on the integrated monitoring and operation screen to a corresponding equipment of a plurality of safety system equipments and non-safety system equipment. The mentioned operation signal sorting means 16 outputs an operating position display signal via the O/E converter.

As a result, according to this eighth embodiment, in addition to the advantages of the foregoing sixth embodiment, further, a plurality of operating position display signals to be sorted and outputted from the operation signal sorting means 16 are also electrically separated from the safety system and the non-safety system to the full, so that as in the sixth embodiment, reliability of the monitoring and operation image integrating system of a plant can be enhanced.

That is, a monitoring and operation screen image of the safety system and a monitoring and operation screen image of the non-safety system are synthesized (integrated) to be displayed as an integrated monitoring and operation screen 20, so that a monitoring and operation image integrating system of a plant that is compact with a few displays can be obtained, and thus a workload of a plant operator can be diminished.

Furthermore, since the operation signal sorting means 16 is provided, operating position coordinate information from the integrated monitoring and operation screen can be correctly transmitted to the safety system and the non-safety system.

Embodiment 9

Figure 9:
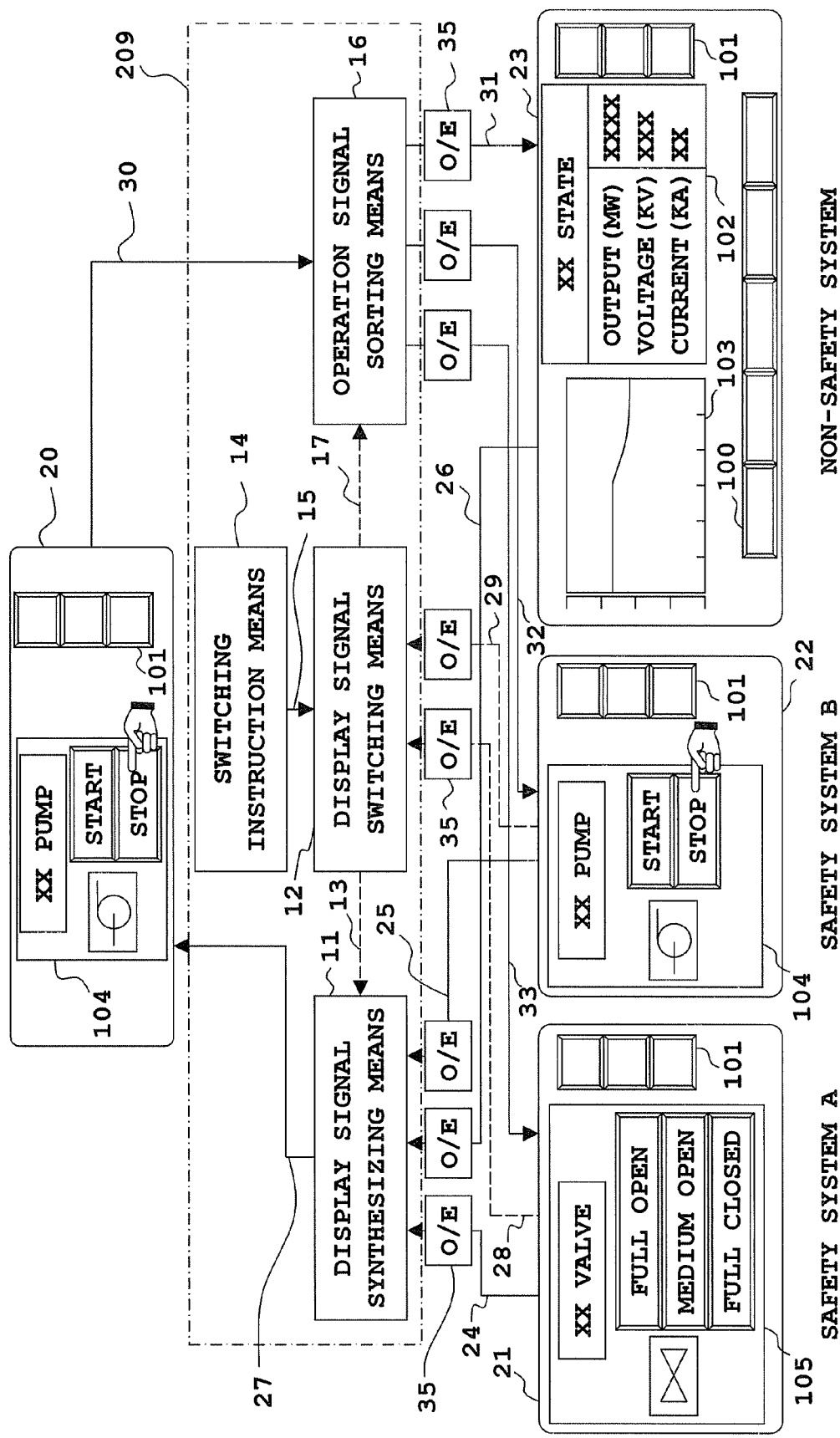
FIG. 9 is a diagram schematically illustrating arrangement of a monitoring and operation image integrating system of a plant according to a ninth embodiment.

FIG. 9 is a diagram schematically illustrating an arrangement of a monitoring and operation image integrating system of a plant according to a ninth embodiment.

The basic arrangement and operations of a display signal synthesizer 209 according to this ninth embodiment are the same as those of the display signal synthesizer 204 according to the foregoing fourth embodiment.

In this ninth embodiment, all signal input/output cables with the safety system A, the safety system B and the non-safety system are of optical fibers, and signals are inputted through O/E (Optic/Electric) converters, whereby not only the safety system and the non-safety system are functionally separated but also the safety system and the non-safety system are electrically separated.

Furthermore, in the monitoring and operation image integrating system of a plant according to this ninth embodiment, the monitoring and operation image integrating system of a plant according to the foregoing eighth embodiment is further provided with switching instruction means 14 for inputting a switching instruction signal causing to select a display signal from desired safety system equipment to the display signal switching means 12, irrespective of a state signal from the plurality of safety system equipments.

As a result, according to this ninth embodiment, in addition to the advantages of the foregoing eighth embodiment, a display signal from desired safety system equipment can be selected, irrespective of a state signal from the plurality of safety system equipments.

Embodiment 10

Figure 10:
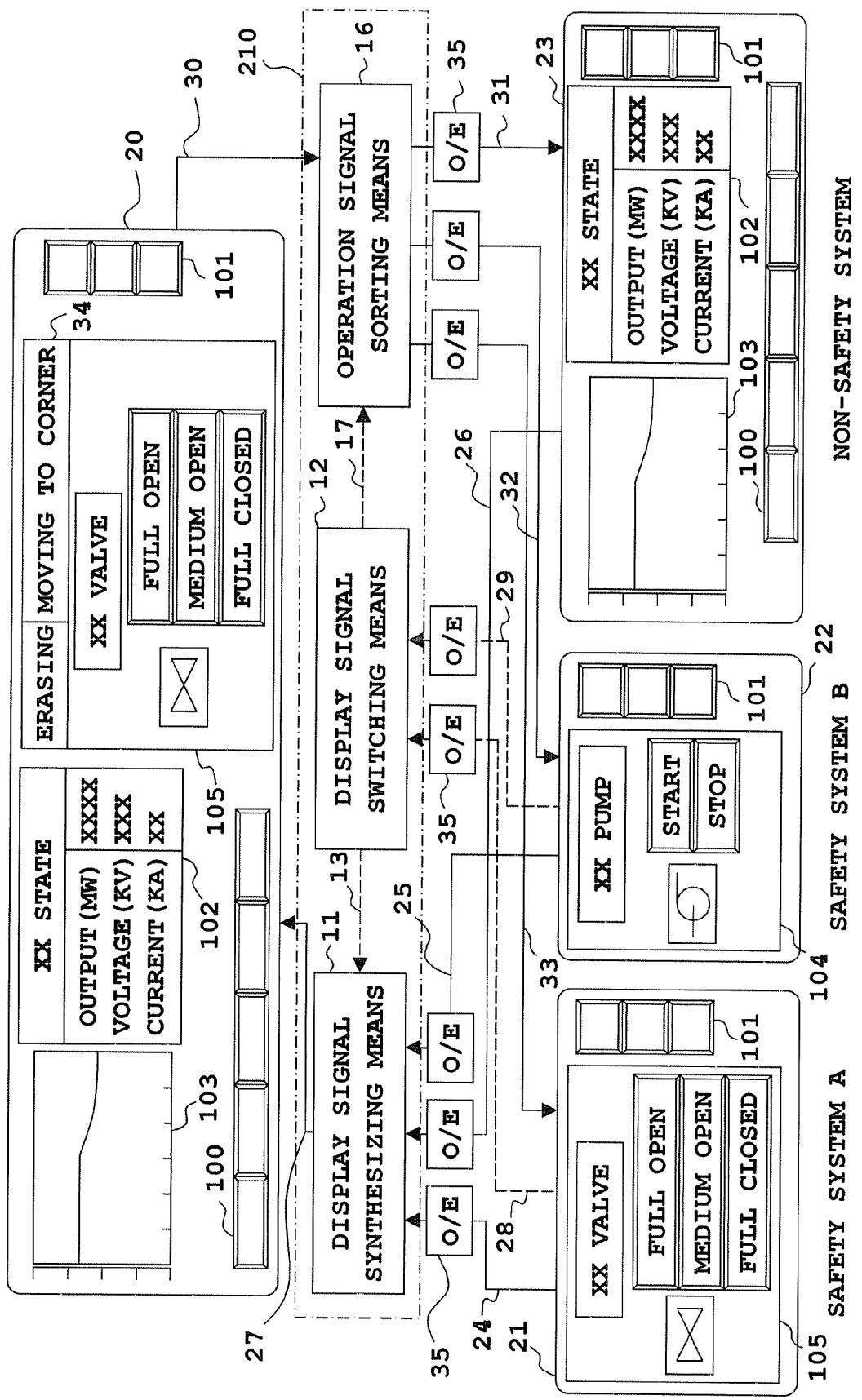
FIG. 10 is a diagram schematically illustrating arrangement of a monitoring and operation image integrating system of a plant according to a tenth embodiment.

FIG. 10 is a diagram schematically illustrating an arrangement of a monitoring and operation image integrating system of a plant according to a tenth embodiment.

The basic arrangement and operations of a display signal synthesizer 210 according to this tenth embodiment are the same as those of the display signal synthesizer 204 according to the foregoing fourth embodiment.

Also in this tenth embodiment, all signal input/output cables with the safety system A, the safety system B and the non-safety system are of optical fibers, and signals are inputted through O/E (Optic/Electric) converters, whereby not only the safety system and the non-safety system are functionally separated, but also the safety system and the non-safety system are electrically separated as well.

Furthermore, in the monitoring and operation image integrating system of a plant according to this tenth embodiment, the monitoring and operation image integrating system of a plant according to the foregoing ninth embodiment image is further provided with moving means for moving an image of safety system equipment being displayed on the integrated monitoring and operation screen 20.

As described in the foregoing fifth embodiment, also in this tenth embodiment, by selection and operation of "moving to corner" of "moving to corner and erasing button 34", the image of the operating device 105 and the image of "moving to corner and erasing button 34" are moved to another position on the integrated monitoring and operation screen 20 (for example, in the case of moving to corner, to four corners of the integrate monitoring and operation screen 20).

Furthermore, by selection and operation of the "erasing button", the image of the operating device 105 can be erased.

By erasing the image of the operating device 105, an image hidden under the image of the operating device 105 can be seen on the integrated monitoring and operation screen 20.

As a result, according to this tenth embodiment, even in the case where the image of an operating device of the safety system is superimposed on the display of information of the non-safety system and thus information of the non-safety system cannot be seen, the image of the operating device of the safety system can be moved or erased, and operation information from the integrated monitoring and operation screen can be correctly transmitted. Furthermore, the safety system and the non-safety system are electrically separated to the full, so that the reliability of the monitoring and operation image integrating system of a plant can be enhanced.

Further, according to an image synthesis method of the monitoring and operation image integrating system of a plant according to the above-described first to tenth embodiments, even in the case where any one of the plurality of safety system equipments and non-safety system equipment becomes in failure, the image of the remaining sound systems can be displayed without being affected by the system in failure.

Furthermore, in the case of making an operation input from an image, an operation signal can be inputted from the image of a sound system without being affected by the system in failure.

Consequently, images of a plurality of safety systems and of non-safety system are synthesized (integrated) into one image, and thus improvement in operation procedures can be largely achieved. In addition, when one system is in failure, the other systems can be prevented from being affected.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A monitoring and operation image integrating system of a plant for monitoring or operating a plant that includes a plurality of safety system equipments and non-safety system equipment each displaying a monitoring and operation screen image, the monitoring and operation image integrating system comprising:

display signal synthesizing means to which a display signal from each of said plurality of safety system equipments and a display signal from said non-safety system equipment are inputted, and which synthesizes one display signal from a selected one of said plurality of safety system equipments and the display signal from said non-safety system equipment;

display signal switching means to which a state signal from each of said plurality of safety system equipments is inputted, each state signal showing a display operation state of whether or not a monitoring and operation screen image of a respective safety system equipment displays an operating device of the respective safety system equipment, and which switches a display signal from the plurality of safety system equipments that has to be synthesized by said display signal synthesizing means based on the plurality of state signals having been inputted; and an integrated monitoring and operation screen display that displays a display signal having been synthesized by said display signal synthesizing means as an integrated monitoring and operation screen of the plant.

2. The monitoring and operation image integrating system of a plant according to claim 1, further comprising switching instruction means for inputting a switching instruction signal for selection of a display signal from a desired safety system equipment, to said display signal switching means;
said display signal switching means outputs a display switching signal based on a switching instruction signal inputted from said switching instruction means, to said display signal synthesizing means, irrespective of a state signal from said plurality of safety system equipments; and
said display signal synthesizing means displays on said integrated monitoring and operation screen only a display signal from a safety system equipment corresponding to a display switching signal output from said display signal switching means.

3. The monitoring and operation image integrating system of a plant according to claim 1, wherein said display signal switching means outputs a signal showing from which safety system equipment a display signal is synthesized on said integrated monitoring and operation screen; the monitoring and operation image integrating system of a plant further comprising operation signal sorting means for sorting and outputting an operating position signal on said integrated monitoring and operation screen to a corresponding equipment of said plurality of safety system equipments and non-safety system equipment.

4. The monitoring and operation image integrating system of a plant according to claim 3, further comprising switching instruction means for inputting a switching instruction signal causing to select a display signal from a desired safety system equipment, to said display signal switching means, irrespective of a state signal from said plurality of safety system equipments.

5. The monitoring and operation image integrating system of a plant according to claim 3, further comprising image moving/erasing means for moving or erasing an image of safety system equipment being displayed on said integrated monitoring and operation screen.

6. The monitoring and operation image integrating system of a plant according to claim 1, further comprising an O/E converter for converting a display signal from said plurality of safety system equipments and a display signal from non-safety system equipment, and said state signal from the plurality of safety system equipments into an optical signal, and outputting each optical signal having been converted to each corresponding said display signal synthesizing means or said display signal switching means via an optical fiber.

7. The monitoring and operation image integrating system of a plant according to claim 2, further comprising an O/E converter for converting a display signal from said plurality of safety system equipments and a display signal from non-safety system equipment, and said state signal from the plurality of safety system equipments into an optical signal, and outputting each optical signal having been converted to each corresponding said display signal synthesizing means or said display signal switching means via an optical fiber.

8. The monitoring and operation image integrating system of a plant according to claim 6, wherein said display signal switching means outputs a signal showing from which safety system equipment a display signal is synthesized on said integrated monitoring and operation screen; the monitoring and operation image integrating system of a plant further comprising operation signal sorting means for sorting and outputting an operating position signal on said integrated monitoring and operation screen to a corresponding equipment of said plurality of safety system equipments and non-safety system equipment; wherein said operation signal sorting means outputs an operating position display signal via an O/E converter.

9. The monitoring and operation image integrating system of a plant according to claim 8, further comprising switching instruction means for inputting a switching instruction signal causing to select a display signal from a desired safety system equipment to said display signal switching means, irrespective of a state signal from said plurality of safety system equipments.

10. The monitoring and operation image integrating system of a plant according to claim 8, further comprising image moving/erasing means for moving or erasing an image of safety system equipment being displayed on said integrated monitoring and operation screen.

11. A monitoring and operation image integrating method of a plant for monitoring or operating a plant that includes a plurality of safety system equipments and non-safety system equipment each displaying a monitoring and operation screen image, the monitoring and operation image integrating method comprising:
a display signal synthesizing step in which a display signal from each of the plurality of safety system equipments and a display signal from the non-safety system equipment are inputted, and one display signal from a selected one of said plurality of safety system equipments and a display signal from said non-safety system equipment are synthesized;
a display signal switching step in which a state signal from each of the plurality of safety system equipments is inputted, each state signal showing a display operation state of whether or not a monitoring and operation screen image of a respective safety system equipment displays an operating device of the respective safety system equipment, and a display signal from the plurality of safety system equipments that has to be synthesized in said display signal synthesizing step is switched based on the plurality of state signals having been inputted; and
an integrated monitoring and operation screen displaying step in which a display signal having been synthesized in said display signal synthesizing step is displayed as an integrated monitoring and operation screen of the plant.

* * * * *